(12) United States Patent
Cui et al.

(10) Patent No.: US 12,151,973 B2
(45) Date of Patent: Nov. 26, 2024

(54) FLY ASH-BASED FOAM GEOPOLYMER, PREPARATION METHOD THEREFOR, AND USE THEREOF

(71) Applicant: SHENZHEN UNIVERSITY, Shenzhen (CN)

(72) Inventors: Hongzhi Cui, Shenzhen (CN); Weipeng Feng, Shenzhen (CN); Dapeng Zheng, Shenzhen (CN); Yu Jin, Shenzhen (CN); Zhijun Dong, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 18/570,315

(22) PCT Filed: Mar. 3, 2022

(86) PCT No.: PCT/CN2022/078941
§ 371 (c)(1),
(2) Date: Dec. 14, 2023

(87) PCT Pub. No.: WO2022/262319
PCT Pub. Date: Dec. 22, 2022

(65) Prior Publication Data
US 2024/0270649 A1 Aug. 15, 2024

(30) Foreign Application Priority Data
Jun. 15, 2021 (CN) .......................... 202110662284.0

(51) Int. Cl.
*C04B 28/00* (2006.01)
*C04B 22/06* (2006.01)
(Continued)

(52) U.S. Cl.
CPC .......... *C04B 28/008* (2013.01); *C04B 22/062* (2013.01); *C04B 22/16* (2013.01);
(Continued)

(58) Field of Classification Search
CPC ..... C04B 28/008; C04B 22/062; C04B 22/16; C04B 24/04; C04B 24/122; C04B 24/20;
(Continued)

(56) References Cited

U.S. PATENT DOCUMENTS 9,908,814 B1 * 3/2018 Young .................. C04B 18/146

FOREIGN PATENT DOCUMENTS

| CN | 101139198 A | * | 3/2008 | .......... C04B 28/142 |
| CN | 103524091 A | | 1/2014 | |

(Continued)

OTHER PUBLICATIONS

Chinese Office Action, for CN Application No. 202110662284.0, 10 pages, dated Jan. 14, 2022. [English Translation].

(Continued)

*Primary Examiner* — K. Boyle
(74) *Attorney, Agent, or Firm* — Viksnins Harris Padys Malen LLP

(57) ABSTRACT

Disclosed herein are a fly ash-based foam geopolymer, a preparation method therefor, and the use thereof. The fly ash-based foam geopolymer is prepared from raw materials comprising the following components in parts by weight: 900-1000 parts of a fly ash-based material; 600-700 parts of a composite alkali solution; 0-10 parts of a thickening agent; 2-6 parts of a foam stabilizer A; 5-10 parts of a water reducer; and 20-40 parts of a foaming agent. The preparation method of the present application is simple, and processes such as ball milling, water washing and calcining do not need to be carried out on the raw materials, such that the investment in a grinding equipment, a water washing equip- (Continued)

ment, a sewage treatment equipment, and a calcining equipment is reduced, and the energy consumption and carbon emissions are reduced. The fly ash-based foam geopolymer prepared by using the fly ash-based material as the main raw material in the present application has a low apparent density and a high early strength, and can be used in the field of fabricated buildings.

30 Claims, 4 Drawing Sheets

(51) Int. Cl.
| | | |
|---|---|---|
| C04B 22/16 | (2006.01) | |
| C04B 24/04 | (2006.01) | |
| C04B 24/12 | (2006.01) | |
| C04B 24/20 | (2006.01) | |
| C04B 24/26 | (2006.01) | |
| C04B 24/38 | (2006.01) | |
| C04B 38/02 | (2006.01) | |
| C04B 103/10 | (2006.01) | |
| C04B 103/30 | (2006.01) | |
| C04B 103/44 | (2006.01) | |
| C04B 103/48 | (2006.01) | |
| C04B 111/40 | (2006.01) | |

(52) U.S. Cl.
CPC ............ *C04B 24/04* (2013.01); *C04B 24/122* (2013.01); *C04B 24/20* (2013.01); *C04B 24/2641* (2013.01); *C04B 24/383* (2013.01); *C04B 38/02* (2013.01); *C04B 2103/10* (2013.01); *C04B 2103/302* (2013.01); *C04B 2103/44* (2013.01); *C04B 2103/48* (2013.01); *C04B 2111/40* (2013.01)

(58) Field of Classification Search
CPC ... C04B 24/2641; C04B 24/383; C04B 28/02; C04B 2103/10; C04B 2103/302; C04B 103/44; C04B 103/48; C04B 2111/40
See application file for complete search history.

(56) References Cited

FOREIGN PATENT DOCUMENTS

| | | | |
|---|---|---|---|
| CN | 107311546 A | 11/2017 | |
| CN | 108341951 A * | 7/2018 | ............ C08F 299/00 |
| CN | 108467224 A | 8/2018 | |
| CN | 108975795 A | 12/2018 | |
| CN | 113213833 A | 8/2021 | |
| KR | 20170036584 A | 4/2017 | |
| WO | 2020037349 A1 | 2/2020 | |

OTHER PUBLICATIONS

Feng, W , et al., "Study of triethanolamine on regulating early strength of fly ash-based chemically foamed geopolymer", Cement and Concrete Research 162, 107005, 18 pages (2022).
Liu, Z , et al., "Research on microstructure and properties of blast furnace slag-fly ash based foam geopolymer", New Building Materials 44 (12), 12-15 (2017). [English Abstract].
Liu, Z , et al., "Research on microstructure and properties of blast furnace slag-fly ash based foam geopolymer", New Building Materials 44 (12), 12-15 (2017). [English Translation Full Text].
Patent Cooperation Treaty , International Search Report for PCT/CN2022/078941, 3 pages dated Jun. 6, 2022. [English Translation].
Zhang, Z , et al., "Low density drilling fluid technology", University of Petroleum Press, pp. 122-123, 1st Ed., 8 pages (2004). [With English Machine Translation.].

* cited by examiner

FLY ASH-BASED FOAM GEOPOLYMER, PREPARATION METHOD THEREFOR, AND USE THEREOF

CROSS-REFERENCE TO RELATED APPLICATION(S)

This patent application claims the benefit of priority of Chinese Patent Application No. 202110662284.0, filed on Jun. 15, 2021.

TECHNICAL FIELD

Embodiments of the present application belong to the technical field of building materials, and relates to industrial solid waste recycling, low-carbon cementitious materials and green construction technologies, for example, a fly ash-based foamed geopolymer and a preparation method therefor and use thereof, and especially an early-strength ultra-light fly ash-based foamed geopolymer and a preparation method therefor and use thereof.

BACKGROUND

In recent years, under the national policy of vigorously promoting assembled buildings, there is a new requirement for prefabricated components, that is, concrete products used for the components can rapidly develop strength in the early stage, which facilitates the internal turnover of molds in the assembled component plants and the ex-factory transportation of the finished components, and reduces the component stacking in the plants. As a porous and lightweight material, foamed concrete has good characteristics of thermal insulation and sound insulation, and is an ideal material for preparing non-structural prefabricated components. However, the production of cement, the raw material of concrete products, consumes a lot of natural resources and energy, and emits a lot of carbon dioxide at the same time, which runs counter to the theme of low-carbon, energy efficiency promotion and green development in China and the goal of "peak carbon dioxide emission" by 2030s. On the other hand, there are a large number of industrial solid wastes produced, as the economy of China is developing rapidly and the industrialization is proceeding continuously. According to the data of recent years, the annual output of fly ash, as one of the industrial solid wastes, remains at about 560 million tons, and the comprehensive utilization efficiency is about 75.96%, wherein the comprehensive utilization efficiency of fly ash in the central and western regions is only 50%. Such large amount of fly ash occupies a lot of land for storage, and the heavy metal elements contained poses a great threat to the environment.

At present, it is a new technology to prepare geopolymer from fly ash rich in active silicon and aluminum by chemical excitation with strong alkaline solutions. Meanwhile, the efficient solidification of heavy metals by geopolymerization technology is an important means to realize the harmlessness of solid waste resources. Hydrogen peroxide can decompose under alkaline conditions and produce oxygen, and based on such characteristic, the geopolymer foam is prepared by adding a hydrogen peroxide solution to geopolymer, which is able to replace the conventional foamed concrete. However, the gel of geopolymer with fly ash as raw material generated in the early stage of reaction is mainly aluminum-rich gel (GEL I), and such geopolymer, which mainly contains GEL I, has extremely low compressive strength, and needs subsequent reactions to transform aluminum-rich gel into silicon-rich gel (GEL II) to improve its strength, and thus cannot meet the demoulding strength requirement of prefabricated components. Strong alkaline solution controls the leaching of silicon, aluminum and other elements from fly ash and promotes the polymerization reaction; however, overly high pH value will aggravate the decomposition of hydrogen peroxide and cause great difficulties to form a stable foam skeleton. For ultra-light foamed geopolymer, the foaming process of excessive hydrogen peroxide is more easily out of control in strong alkaline environment. Therefore, the contradiction between the strong alkaline condition on which the early strength of geopolymer depends and the violent reaction of hydrogen peroxide under the high alkaline condition is the core problem to be solved in preparing the early-strength ultra-light fly ash-based foamed geopolymer.

CN108975795A discloses a geopolymer foam, a preparation method therefor and use thereof. The geopolymer foam comprises the following components: 30-50 parts by weight of metakaolin, 40-50 parts by weight of alkali activator, 1-4 parts by weight of fly ash, 2-5 parts by weight of foaming agent, 0.3-0.7 parts by weight of foam stabilizer, 0.3-0.8 parts by weight of modified sisal fibers, 1-4 parts by weight of paraffin emulsion, 5-10 parts by weight of water and 0.3-0.7 parts by weight of anhydrous ethanol. Compared with the conventional impervious and waterproof cement-based material and cement-based protective material, the geopolymer foam of this application has good crack resistance, excellent waterproof performance, excellent durability, good long-term service performance, acid and alkali resistance, freeze-thaw resistance, carbonation resistance and other performance, which can be widely used in basic engineering fields such as tunnel composite lining. However, the geopolymer foam of this application does not have the characteristics of early strength and ultra-light weight, and the amount of solid waste fly ash used is also small.

Therefore, in this field, it is expected to develop a fly ash-based foamed geopolymer which can make full use of solid waste and has early strength and ultra-light weight.

SUMMARY

The following is a summary of the subject matter described in detail herein. This summary is not intended to limit the protection scope of the claims.

In view of the shortcomings of the related art, an object of the present application is to provide a fly ash-based foamed geopolymer, a preparation method therefor and use thereof, and especially, to provide an early-strength ultra-light fly ash-based foamed geopolymer, a preparation method therefor and use thereof. The fly ash-based foamed geopolymer of the present application has the advantages of high early strength and high porosity, which is particularly suitable for the production of assembled non-structural prefabricated components. Meanwhile, the large-scale production of fly ash-based foamed geopolymer can not only save the cost of raw materials, but also alleviate the environment pollution of solid waste accumulation to soil and groundwater. The fly ash-based foamed geopolymer is mainly used in the field of assembled building materials.

In a first aspect, embodiments of the present application provide a fly ash-based foamed geopolymer, wherein raw materials for preparing the fly ash-based foamed geopolymer comprise the following components in parts by weight:
 900-1000 parts of a fly ash-based material;
 600-700 parts of a composite alkali solution;
 0-10 parts of a thickener;

2-6 parts of a foam stabilizer A;

5-10 parts of a water reducer; and 20-40 parts of a foaming agent.

The fly ash-based foamed geopolymer of the present application uses the fly ash-based material as the main raw material, which reduces the production cost and is suitable for large-scale production. Meanwhile, the problem of industrial waste residue disposal is effectively solved, the natural resources are saved and the ecological environment is protected. The fly ash-based foamed geopolymer of the present application has both low apparent density and high early strength.

Compared with the conventional cement-based foam materials, the fly ash-based foamed geopolymer of the present application realizes large-scale utilization of industrial solid waste resources such as fly ash, and has the characteristics of low energy consumption in preparation and low carbon emission. Compared with the related geopolymer-based foam materials, in the present application, the fly ash-based foamed geopolymer can obtain a large number of uniform and fine pores and also higher early strength at the same time by adjusting the foaming speed of foaming agent via composite alkali solution, adjusting the foam collapse time via foam stabilizer A, and fixing the spatial distribution of foams via thickener.

The fly ash-based foamed geopolymer of the present application can achieve the utilization efficiency of fly ash of up to 90% or above, and also, achieve the dry density of A05 grade specified in the industry standard JGT266-2011 "Foamed Concrete" and reach the strength of C3 grade after one-day steam curing and seven-day standard curing, which overcomes the problem that the fly ash-based foamed concrete obtained from conventional preparation method cannot achieve high fly-ash utilization efficiency, low density and high strength at the same time, and meets the needs of assembly plants in production that light components can be demoulded earlier and molds can cycled faster.

In the present application, in the raw materials for preparing the fly ash-based foamed geopolymer, the use amount of the fly ash-based material can be 900 parts, 910 parts, 920 parts, 930 parts, 940 parts, 950 parts, 960 parts, 970 parts, 980 parts, 990 parts or 1000 parts.

In the present application, in the raw materials for preparing the fly ash-based foamed geopolymer, the use amount of the composite alkali solution can be 600 parts, 610 parts, 620 parts, 630 parts, 640 parts, 650 parts, 660 parts, 670 parts, 680 parts, 690 parts or 700 parts.

If the use amount of composite alkali solution is less than 600 parts, the activity of fly ash-based material cannot be fully activated, and the strength of the final product will be affected; if the use amount of composite alkali solution is more than 700 parts, the product surface will easily have alkali solids and look white, and the product surface quality will be affected.

In the present application, in the raw materials for preparing the fly ash-based foamed geopolymer, the use amount of thickener can be 0, 1 part, 2 parts, 3 parts, 4 parts, 5 parts, 6 parts, 7 parts, 8 parts, 9 parts or 10 parts.

In the present application, in the raw materials for preparing the fly ash-based foamed geopolymer, the use amount of foam stabilizer A can be 2 parts, 3 parts, 4 parts, 5 parts or 6 parts.

In the present application, in the raw materials for preparing the fly ash-based foamed geopolymer, the use amount of water reducer can be 5 parts, 6 parts, 7 parts, 8 parts, 9 parts or 10 parts.

In the present application, in the raw materials for preparing the fly ash-based foamed geopolymer, the use amount of foaming agent can be 20 parts, 23 parts, 25 parts, 28 parts, 30 parts, 33 parts, 35 parts, 38 parts or 40 parts.

If the use amount of foaming agent is less than 20 parts, the final product cannot achieve foaming effect, the apparent density will be higher than expected, and the product cannot achieve light weight; if the use amount of foaming agent is more than 40 parts, the final product will foam excessively, and the apparent density will be lower than expected, but the product strength will not meet the requirements.

Preferably, the fly ash-based material is prepared by the following preparation method:

mixing fly ash with a calcareous material to obtain the fly ash-based material.

The fly ash in the present application is the residual product after combusting pulverized coal in thermal power plants.

Preferably, based on a mass of the fly ash-based material being 100%, the fly ash has a content of 90%-100%, such as 90%, 91%, 92%, 93%, 94%, 95%, 96%, 97%, 98%, 99% or 100%, and the calcareous material has a content of 0%-10%, such as 0%, 1%, 2%, 3%, 4%, 5%, 6%, 7%, 8%, 9% or 10%.

Preferably, the calcareous material comprises any one or a combination of at least two of cement, ore slags, gypsum or metakaolin.

Preferably, the composite alkali solution is prepared by the following preparation method:

mixing a composite alkali activator, a metal complexing agent and a foam stabilizer B to obtain the composite alkali solution.

Preferably, based on a mass of the composite alkali solution being 100%, the composite alkali activator has a content of 95%-98%, such as 95%, 95.5%, 96%, 96.5%, 97%, 97.5% or 98%, the metal complexing agent has a content of 0.05%-0.5%, such as 0.05%, 0.1%, 0.2%, 0.3%, 0.4% or 0.5%, and the foam stabilizer B has a content of 1.95%-4.5%, such as 1.95%, 2%, 2.5%, 3%, 3.5%, 4% or 4.5%

If no metal complexing agent is added, the pores formed by foam will be large, and the strength of the product will be reduced; if the content of metal complexing agent is higher than 0.5%, the product will have poor fluidity and will be difficult to be injected into the mold.

Preferably, the composite alkali activator has a modulus of 1.0-1.5, such as 1.0, 1.1, 1.2, 1.3, 1.4 or 1.5.

Preferably, the metal complexing agent comprises any one or a combination of at least two of triethanolamine, methyldiethanolamine, diisopropanolamine, diethanolisopropanolamine, triethanolamine or triisopropanolamine.

Preferably, the metal complexing agent has a solid content of not less than 78%, such as 78%, 80%, 83%, 85%, 88% or 90%.

Preferably, the foam stabilizer B comprises any one or a combination of at least two of sodium dodecylbenzenesulfonate powders, sodium dodecyl sulfate powders, trisodium phosphate powders or calcium dodecyl sulfate powders.

Preferably, the foam stabilizer B has a purity of not less than 88%.

Preferably, the composite alkali activator is prepared by the following preparation method:

adding sodium hydroxide powders and water into water glass, and stirring to obtain the composite alkali activator.

Preferably, based on a mass of the composite alkali activator being 100%, the sodium hydroxide powders have a content of 8.5%-9%, such as 8.5%, 8.6%, 8.7%, 8.8%, 8.9% or 9%, the water has a content of 4.5%-7%, such as 4.5%, 5%, 5.5%, 6%, 6.5% or 7%, and the water glass has a content of 84%-87%, such as 84%, 84.5%, 85%, 85.5%, 86%, 86.5% or 87%.

Preferably, the sodium hydroxide powders have a purity of not less than 96%.

Preferably, the water is tap water.

Preferably, the water glass has a modulus of 1.0-3.8, such as 1.0, 1.5, 2.0, 2.5, 3.0, 3.5 or 3.8, and a Baume degree of 34.0-42.0, such as 34.0, 35.0, 36.0, 37.0, 38.0, 39.0, 40.0, 41.0 or 42.0.

Preferably, the thickener comprises methyl cellulose ether and/or carboxymethyl cellulose ether, preferably methyl cellulose ether and carboxymethyl cellulose ether.

Preferably, the thickener has a purity of not less than 96%.

Preferably, the thickener has a viscosity of not less than 30000 cp, such as 30000 cp, 35000 cp, 40000 cp, 45000 cp or 50000 cp.

Preferably, the foam stabilizer A comprises trisodium phosphate and/or calcium stearate powders.

Preferably, the trisodium phosphate has a purity of not less than 98%.

Preferably, the calcium stearate powders have a purity of not less than 99%.

Preferably, the water reducer comprises any one or a combination of at least two of a polycarboxylic acid water reducer, a naphthalene sulfonate water reducer, an aliphatic water reducer, a lignosulfonate water reducer or an aminosulfonate water reducer.

Preferably, the foaming agent comprises a hydrogen peroxide solution.

Preferably, the hydrogen peroxide solution has a concentration of not less than 30%, such as 30%, 33%, 35%, 38% or 40%. In the present application, the concentration of hydrogen peroxide solution is not less than 30%, which means that the mass concentration of hydrogen peroxide solute is not less than 30% in the hydrogen peroxide solution.

In a second aspect, embodiments of the present application provide a preparation method for the fly ash-based foamed geopolymer described in the first aspect, and the preparation method comprises the following steps:

(1) mixing the fly ash-based material, the composite alkali solution, the thickener, the foam stabilizer A and the water reducer according to formula amounts to obtain a slurry;

(2) adding the foaming agent into the slurry obtained in step (1), stirring to obtain a mixture, and then injecting the mixture into a mold; and (3) placing the mixture and the mold in step (2) in a curing cabin for curing, demoulding, and then placing the demoulded sample in a standard curing environment for curing, so as to obtain the fly ash-based foamed geopolymer.

Preferably, the stirring in step (1) is carried out in a mixing kettle.

Preferably, a stirring blade for the stirring in step (1) has a revolution speed of 115-135 r/min, such as 115 r/min, 120 r/min, 125 r/min, 130 r/min or 135 r/min, and a rotation speed of 275-295 r/min, such as 275 r/min, 280 r/min, 285 r/min, 290 r/min or 295 r/min.

Preferably, the stirring in step (1) is performed for a period of 4-6 min, such as 4 min, 4.5 min, 5 min, 5.5 min or 6 min.

Preferably, a stirring blade for the stirring in step (2) has a revolution speed of 57-67 r/min, such as 57 r/min, 60 r/min, 63 r/min, 65 r/min or 67 r/min, and a rotation speed of 135-145 r/min, such as 135 r/min, 138 r/min, 140 r/min, 143 r/min or 145 r/min.

Preferably, the stirring in step (2) is performed for a period of 20-40 s, such as 20 s, 23 s, 25 s, 28 s, 30 s, 33 s, 35 s, 38 s or 40 s.

Preferably, the process of injecting the mixture into the mold in step (2) is to inject the mixture into the mold to the ½ depth.

Preferably, after the mixture is injected into the mold, the mold is covered with a polyethylene film to avoid water evaporation.

Preferably, the curing cabin in step (3) has a temperature of 65-75° C., such as 65° C., 68° C., 70° C., 73° C. or 75° C.

Preferably, the process of curing in the curing cabin in step (3) is performed for a period of 12-24 h, such as 12 h, 14 h, 15 h, 16 h, 18 h, 20 h, 22 h or 24 h.

Preferably, the standard curing environment in step (3) has a temperature of 18-22° C., such as 18° C., 19° C., 20° C., 21° C. or 22° C., and a humidity of at least 95%, such as 95%, 96%, 97% or 98%.

Preferably, the process of curing in the standard curing environment in step (3) is performed for a period of 7 days.

In a third aspect, embodiments of the present application provide use of the fly ash-based foamed geopolymer described in the first aspect in building materials.

Preferably, the building materials comprise assembled building materials.

Compared with the related art, the embodiments of the present application have the following beneficial effects:

(1) in the embodiments of the present application, the fly ash-based material is used as the main raw material to prepare the fly ash-based foamed geopolymer, which reduces the production cost and is suitable for large-scale production; meanwhile, in the present application, the problem of industrial waste residue disposal is effectively solved, the natural resources are saved and the ecological environment is protected;

(2) the fly ash-based foamed geopolymer in the embodiments of the present application has a low apparent density (421.7-521.4 kg/m$^3$) and a high early strength (7-day compressive strength: 1.56-3.60 MPa), and the strength of the components still develops rapidly after demoulding, which can avoid the loss caused by lifting and transporting of the components, facilitate the internal turnover of molds in the assembled component plants and the ex-factory transportation of the finished components, and reduce the cost pressure of storage brought by component stacking in the plants; and (3) for the preparation method of the fly ash-based foamed geopolymer in the embodiments of the present application, the raw materials do not require ball milling, water washing, calcination, or other processes, the investments on grinding equipment, water washing equipment, sewage treatment equipment and calcination equipment are reduced, the energy consumption and carbon emission are reduced, there is no strong smell of chemical reagents, the cost is low, and there is no pollution to the atmospheric environment.

Other aspects will become apparent upon reading and understanding the accompanying drawings and detailed description.

BRIEF DESCRIPTION OF DRAWINGS

The accompanying drawings are used to provide a further understanding of the technical solutions herein and consti

DETAILED DESCRIPTION

Figure 1:
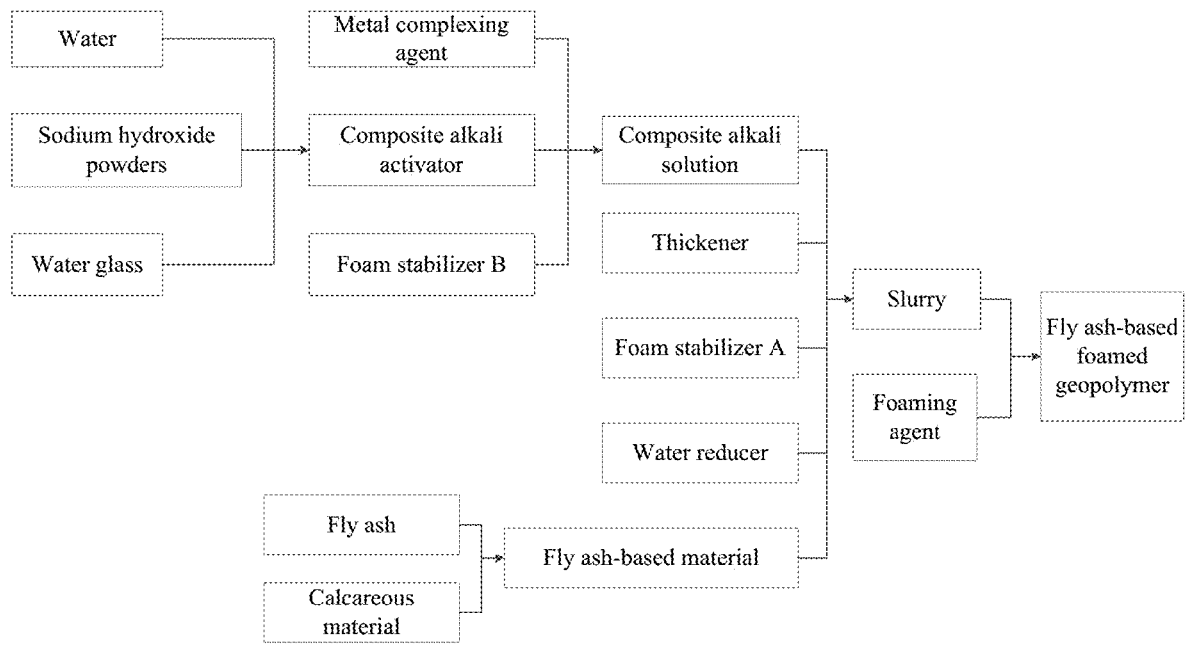
- FIG. 1 is a schematic diagram of raw materials used for a fly ash-based foamed geopolymer in the examples of the present application.

The technical solutions of the present application will be further illustrated below in terms of specific embodiments. It should be clear to those skilled in the art that the examples are only used for a better understanding of the present application and should not be regarded as a specific limitation to the present application.

Unless otherwise defined, all technical and scientific terms used in the present application have the same meaning as commonly understood by those skilled in the art to which the present application pertains. The terms used in the specification of the present application are only used for describing specific examples and are not intended to limit the present application.

The fly ash used in the examples of the present application is the fly ash of Grade II or above specified in the national standard GB/T 1596-2017 "Fly Ash Used for Cement and Concrete", with $SO_3 \leq 3.0$; the slag used in the examples of the present application is the ground granulated blast furnace slag of S95 grade or above specified in GB/T 18046-2017 "Ground Granulated Blast Furnace Slag Used for Cement, Mortar and Concrete".

Example 1

This example provides a fly ash-based foamed geopolymer, and raw materials for preparing the fly ash-based foamed geopolymer comprise the following components in parts by weight:
  900 parts of a fly ash-based material;
  600 parts of a composite alkali solution;
  2 parts of a foam stabilizer A;
  5 parts of a water reducer; and
  20 parts of a foaming agent.

In the raw materials, the foam stabilizer A is calcium stearate powders with a purity of not less than 99%; the water reducer is a polycarboxylic acid water reducer; the foaming agent is a hydrogen peroxide solution with a concentration of 30%; the fly ash-based material is 100% fly ash.

The composite alkali solution is prepared by the following preparation method:

a composite alkali activator, a metal complexing agent and a foam stabilizer B were stirred and mixed thoroughly, so as to obtain the composite alkali solution.

Based on a mass of the composite alkali solution being 100%, the composite alkali activator had a content of 96%, the metal complexing agent had a content of 0.3%, and the foam stabilizer B had a content of 3.7%; the composite alkali activator had a modulus of 1.0; the metal complexing agent was triethanolamine with a solid content of not less than 78%; the foam stabilizer B was sodium dodecylbenzenesulfonate powders with a purity of not less than 88%.

The composite alkali activator is prepared by the following preparation method:
  sodium hydroxide powders and water were added to water glass, stirred thoroughly, then sealed and put aside for later use, so as to obtain the composite alkali activator;
  based on a mass of the composite alkali activator being 100%, the sodium hydroxide powders had a content of 9%, the water had a content of 5.8%, the water glass had a content of 85.2%; the sodium hydroxide powders had a purity of not less than 96%; the water was tap water; the water glass had a modulus of 1.0 and a Baume degree of 34.0.

A preparation method of the fly ash-based foamed geopolymer comprises the following steps:
(1) the fly ash-based material, the composite alkali solution, the foam stabilizer A and the water reducer were put in a mixing kettle according to the formula amounts, and rapidly stirred for 6 min where the stirring blade had a revolution speed of 115 r/min and a rotation speed of 275 r/min, such that the neat slurry was uniform and no solid powders were settled down, so as to obtain a slurry;
(2) the foaming agent was quickly added into the slurry obtained in step (1), and slowly stirred for 40 s where the stirring blade had a revolution speed of 57 r/min and a rotation speed of 135 r/min, so as to obtain a mixture, and subsequently the mixture was quickly injected into a mold to the ½ depth, and then the mold was covered with a polyethylene film to avoid water loss; and
(3) the mixture obtained in step (2) and the mold were placed in a curing cabin at 65° C. and cured for 24 h and then demoulded, and subsequently, the demoulded sample was placed in a standard curing environment where a temperature was 20° C. and a humidity was 95% and cured for 7 days, so as to obtain the fly ash-based foamed geopolymer.

The schematic diagram of raw materials used for the fly ash-based foamed geopolymer in this example is shown in FIG. 1.

Figure 2:
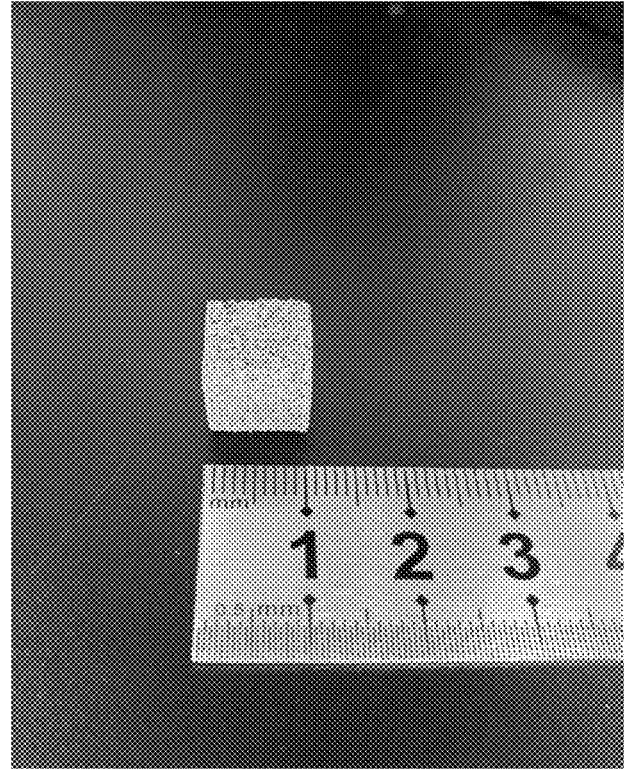
FIG. 2 is an appearance view of a finished fly ash-based foamed geopolymer prepared in Example 1.
Figure 3:
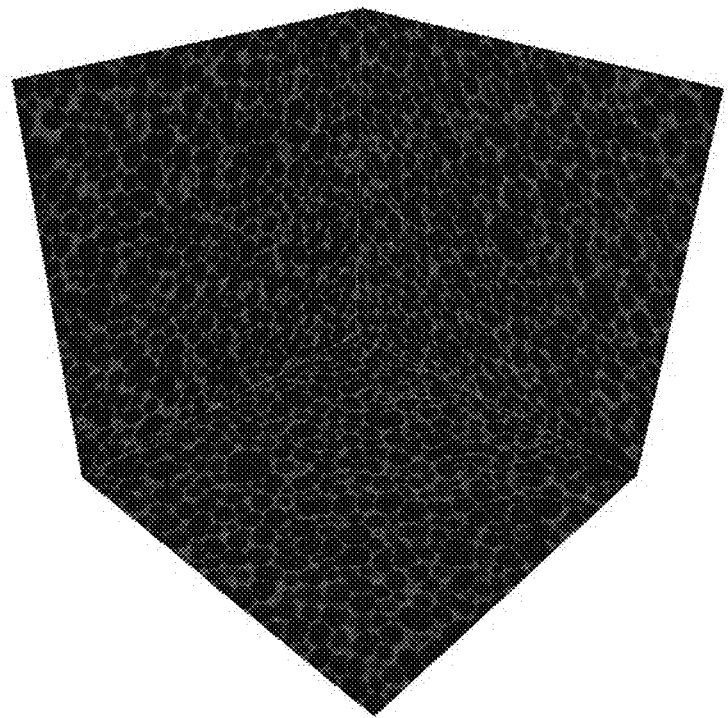
FIG. 3 is an X-ray tomographic reconstruction projection of a fly ash-based foamed geopolymer prepared in Example 1.
Figure 4:
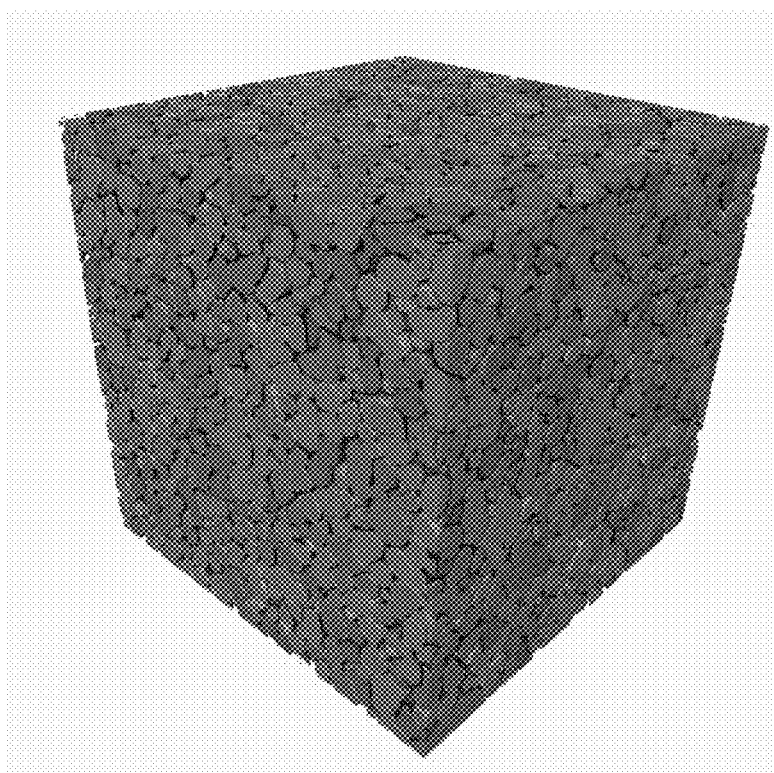
FIG. 4 is a pore distribution diagram of a fly ash-based foamed geopolymer prepared in Example 1 after X-ray tomographic reconstruction.

The appearance view of the finished fly ash-based foamed geopolymer prepared in this example is shown in FIG. 2, the X-ray tomographic reconstruction projection is shown in FIG. 3, and the pore distribution diagram after X-ray tomographic reconstruction is shown in FIG. 4. As can be seen from the drawings, the sample of fly ash-based foamed geopolymer prepared in this example has dense and uniform pores, good pore independence, high restriction on pore connectivity, no visible defects in the sample skeleton, and strong structural support for the pores. The size of the sample of fly ash-based foamed geopolymer in FIG. 2 does not represent the size of the sample prepared in this example, which is only the size taken for testing.

Example 2

This example provides a fly ash-based foamed geopolymer, and raw materials for preparing the fly ash-based foamed geopolymer comprise the following components in parts by weight:

1000 parts of a fly ash-based material;
700 parts of a composite alkali solution;
10 parts of a thickener;
6 parts of a foam stabilizer A;
10 parts of a water reducer; and
40 parts of a foaming agent.

In the raw materials, the thickener is methyl cellulose ether with a purity of not less than 96% and a viscosity of 30000 cp; the foam stabilizer A is calcium stearate powders with a purity of not less than 99%; the water reducer is a polycarboxylic acid water reducer; the foaming agent is a hydrogen peroxide solution with a concentration of 30%.

The fly ash-based material is prepared by the following preparation method:
fly ash and a calcareous material were added in a mixing kettle and stirred and mixed thoroughly, so as to obtain the fly ash-based material.

Based on a mass of the fly ash-based material being 100%, the fly ash had a content of 90%, and the calcareous material had a content of 10%; the calcareous material was ore slags.

The composite alkali solution is prepared by the following preparation method:
a composite alkali activator, a metal complexing agent and a foam stabilizer B were stirred and mixed thoroughly, so as to obtain the composite alkali solution.

Based on a mass of the composite alkali solution being 100%, the composite alkali activator had a content of 95%, the metal complexing agent had a content of 0.5%, and the foam stabilizer B had a content of 4.5%; the composite alkali activator had a modulus of 1.5; the metal complexing agent was triethanolamine with a solid content of not less than 78%; the foam stabilizer B was sodium dodecylbenzenesulfonate powders with a purity of not less than 88%.

The composite alkali activator is prepared by the following preparation method:
sodium hydroxide powders and water were added to water glass, stirred thoroughly, then sealed and put aside for later use, so as to obtain the composite alkali activator; based on a mass of the composite alkali activator being 100%, the sodium hydroxide powders had a content of 8.5%, the water had a content of 4.5%, the water glass had a content of 87%; the sodium hydroxide powders had a purity of not less than 96%; the water was tap water; the water glass had a modulus of 3.8 and a Baume degree of 42.0.

A preparation method of the fly ash-based foamed geopolymer comprises the following steps:
(1) the fly ash-based material, the composite alkali solution, the thickener, the foam stabilizer A and the water reducer were put in a mixing kettle according to the formula amounts, and rapidly stirred for 4 min where the stirring blade had a revolution speed of 135 r/min and a rotation speed of 295 r/min, such that the neat slurry was uniform and no solid powders were settled down, so as to obtain a slurry;
(2) the foaming agent was quickly added into the slurry obtained in step (1), and slowly stirred for 20 s where the stirring blade had a revolution speed of 67 r/min and a rotation speed of 145 r/min, so as to obtain a mixture, and subsequently the mixture was quickly injected into a mold to the ½ depth, and then the mold was covered with a polyethylene film to avoid water loss; and
(3) the mixture obtained in step (2) and the mold were placed in a curing cabin at 75° C. and cured for 24 h and then demoulded, and subsequently, the demoulded sample was placed in a standard curing environment where a temperature was 20° C. and a humidity was 96% and cured for 7 days, so as to obtain the fly ash-based foamed geopolymer.

The schematic diagram of raw materials used for the fly ash-based foamed geopolymer in this example is shown in FIG. 1.

Figure 5:
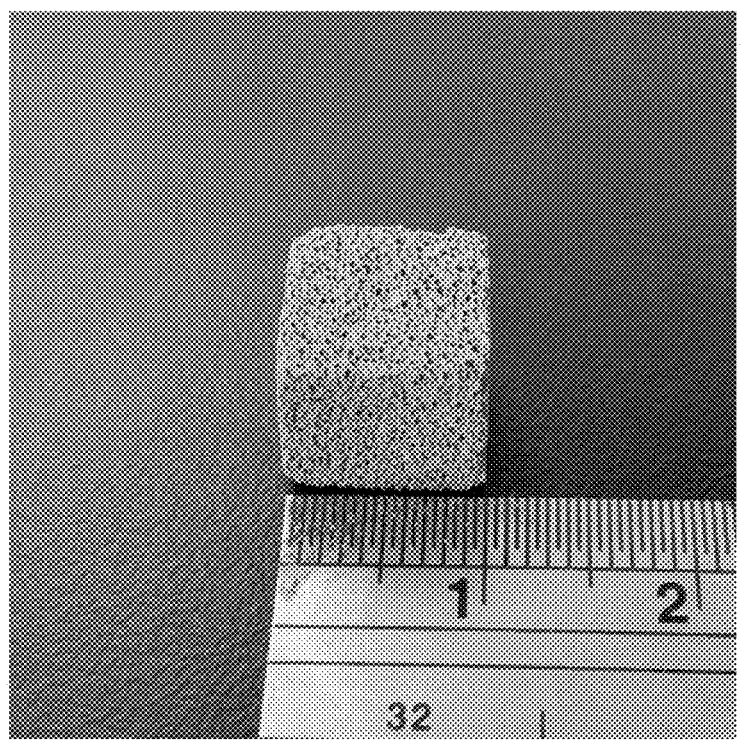
FIG. 5 is an appearance view of a finished fly ash-based foamed geopolymer prepared in Example 2.
Figure 6:
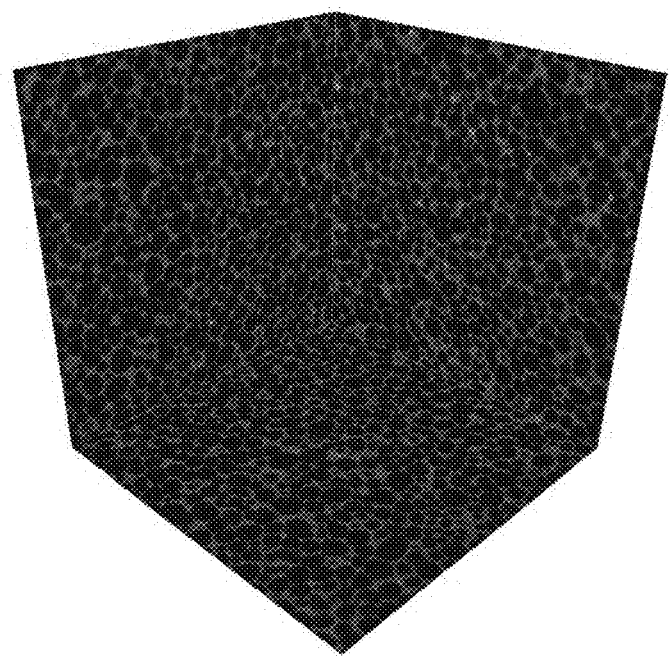
FIG. 6 is an X-ray tomographic reconstruction projection of a fly ash-based foamed geopolymer prepared in Example 2.
Figure 7:
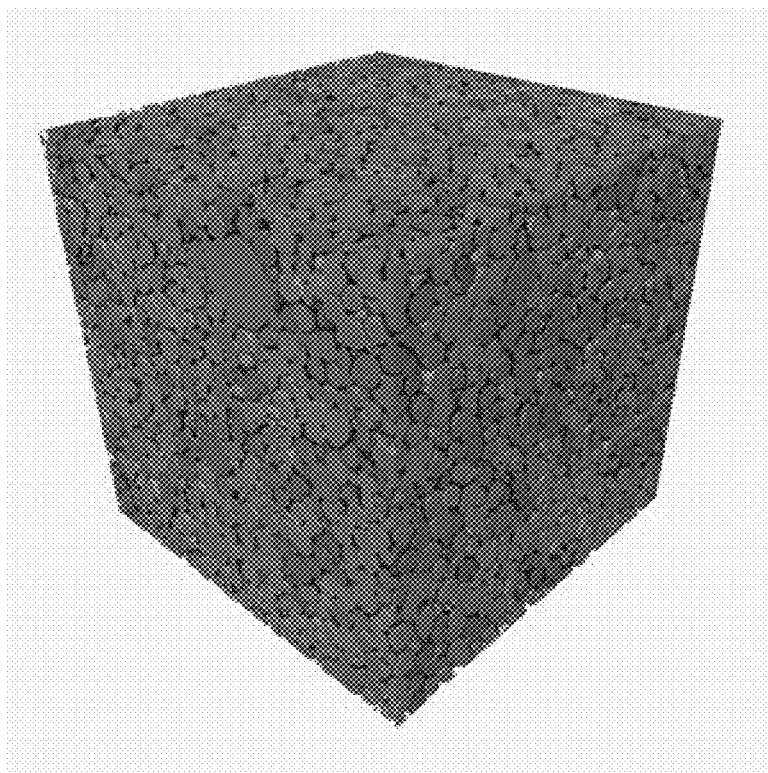
FIG. 7 is a pore distribution diagram of a fly ash-based foamed geopolymer prepared in Example 2 after X-ray tomographic reconstruction.

The appearance view of the finished fly ash-based foamed geopolymer prepared in this example is shown in FIG. 5, the X-ray tomographic reconstruction projection is shown in FIG. 6, and the pore distribution diagram after X-ray tomographic reconstruction is shown in FIG. 7. As can be seen from the drawings, the sample of fly ash-based foamed geopolymer prepared in this example has dense and uniform pores, good pore independence, high restriction on pore connectivity, no visible defects in the sample skeleton, and strong structural support for the pores. The size of the sample of fly ash-based foamed geopolymer in FIG. 5 does not represent the size of the sample prepared in this example, which is only the size taken for testing.

Example 3

This example provides a fly ash-based foamed geopolymer, and raw materials for preparing the fly ash-based foamed geopolymer comprise the following components in parts by weight:
920 parts of a fly ash-based material;
620 parts of a composite alkali solution;
2 parts of a thickener;
3 parts of a foam stabilizer A;
6 parts of a water reducer; and
25 parts of a foaming agent.

In the raw materials, the thickener is carboxymethyl cellulose ether with a purity of not less than 96% and a viscosity of 35000 cp; the foam stabilizer A is trisodium phosphate with a purity of not less than 98%; the water reducer is a polycarboxylic acid water reducer; the foaming agent is a hydrogen peroxide solution with a concentration of 30%.

The fly ash-based material is prepared by the following preparation method:
fly ash and a calcareous material were added in a mixing kettle and stirred and mixed thoroughly, so as to obtain the fly ash-based material.

Based on a mass of the fly ash-based material being 100%, the fly ash had a content of 92%, and the calcareous material had a content of 8%; the calcareous material was ore slags.

The composite alkali solution is prepared by the following preparation method:
a composite alkali activator, a metal complexing agent and a foam stabilizer B were stirred and mixed thoroughly, so as to obtain the composite alkali solution.

Based on a mass of the composite alkali solution being 100%, the composite alkali activator had a content of 98%, the metal complexing agent had a content of 0.05%, and the foam stabilizer B had a content of 1.95%; the composite alkali activator had a modulus of 1.3; the metal complexing agent was triethanolamine with a solid content of not less than 78%; the foam stabilizer B was sodium dodecylbenzenesulfonate powders with a purity of not less than 88%.

The composite alkali activator is prepared by the following preparation method:
sodium hydroxide powders and water were added to water glass, stirred thoroughly, then sealed and put aside for later use, so as to obtain the composite alkali activator;

based on a mass of the composite alkali activator being 100%, the sodium hydroxide powders had a content of 9%, the water had a content of 7%, the water glass had a content of 84%; the sodium hydroxide powders had a purity of not less than 96%; the water was tap water; the water glass had a modulus of 2.0 and a Baume degree of 36.0.

A preparation method of the fly ash-based foamed geopolymer comprises the following steps:
(1) the fly ash-based material, the composite alkali solution, the thickener, the foam stabilizer A and the water reducer were put in a mixing kettle according to the formula amounts, and rapidly stirred for 5 min where the stirring blade had a revolution speed of 120 r/min and a rotation speed of 280 r/min, such that the neat slurry was uniform and no solid powders were settled down, so as to obtain a slurry;
(2) the foaming agent was quickly added into the slurry obtained in step (1), and slowly stirred for 30 s where the stirring blade had a revolution speed of 60 r/min and a rotation speed of 140 r/min, so as to obtain a mixture, and subsequently the mixture was quickly injected into a mold to the ½ depth, and then the mold was covered with a polyethylene film to avoid water loss; and
(3) the mixture obtained in step (2) and the mold were placed in a curing cabin at 70° C. and cured for 24 h and then demoulded, and subsequently, the demoulded sample was placed in a standard curing environment where a temperature was 20° C. and a humidity was 97% and cured for 7 days, so as to obtain the fly ash-based foamed geopolymer.

The schematic diagram of raw materials used for the fly ash-based foamed geopolymer in this example is shown in FIG. 1.

Example 4

This example provides a fly ash-based foamed geopolymer, and raw materials for preparing the fly ash-based foamed geopolymer comprise the following components in parts by weight:
950 parts of a fly ash-based material;
650 parts of a composite alkali solution;
5 parts of a thickener;
4 parts of a foam stabilizer A;
8 parts of a water reducer; and
30 parts of a foaming agent.

In the raw materials, the thickener is carboxymethyl cellulose ether with a purity of not less than 96% and a viscosity of 40000 cp; the foam stabilizer A is trisodium phosphate with a purity of not less than 98%; the water reducer is a polycarboxylic acid water reducer; the foaming agent is a hydrogen peroxide solution with a concentration of 30%.

The fly ash-based material is prepared by the following preparation method:
fly ash and a calcareous material were added in a mixing kettle and stirred and mixed thoroughly, so as to obtain the fly ash-based material.

Based on a mass of the fly ash-based material being 100%, the fly ash had a content of 95%, and the calcareous material had a content of 5%; the calcareous material was ore slags.

The composite alkali solution is prepared by the following preparation method:

a composite alkali activator, a metal complexing agent and a foam stabilizer B were stirred and mixed thoroughly, so as to obtain the composite alkali solution.

Based on a mass of the composite alkali solution being 100%, the composite alkali activator had a content of 97%, the metal complexing agent had a content of 0.1%, and the foam stabilizer B had a content of 2.9%; the composite alkali activator had a modulus of 1.2; the metal complexing agent was triethanolamine with a solid content of not less than 78%; the foam stabilizer B was sodium dodecylbenzenesulfonate powders with a purity of not less than 88%.

The composite alkali activator is prepared by the following preparation method:
sodium hydroxide powders and water were added to water glass, stirred thoroughly, then sealed and put aside for later use, so as to obtain the composite alkali activator;
based on a mass of the composite alkali activator being 100%, the sodium hydroxide powders had a content of 8.8%, the water had a content of 5%, the water glass had a content of 86.2%; the sodium hydroxide powders had a purity of not less than 96%; the water was tap water; the water glass had a modulus of 3.0 and a Baume degree of 40.0.

A preparation method of the fly ash-based foamed geopolymer comprises the following steps:
(1) the fly ash-based material, the composite alkali solution, the thickener, the foam stabilizer A and the water reducer were put in a mixing kettle according to the formula amounts, and rapidly stirred for 5 min where the stirring blade had a revolution speed of 130 r/min and a rotation speed of 285 r/min, such that the neat slurry was uniform and no solid powders were settled down, so as to obtain a slurry;
(2) the foaming agent was quickly added into the slurry obtained in step (1), and slowly stirred for 30 s where the stirring blade had a revolution speed of 65 r/min and a rotation speed of 140 r/min, so as to obtain a mixture, and subsequently the mixture was quickly injected into a mold to the ½ depth, and then the mold was covered with a polyethylene film to avoid water loss; and
(3) the mixture obtained in step (2) and the mold were placed in a curing cabin at 70° C. and cured for 24 h and then demoulded, and subsequently, the demoulded sample was placed in a standard curing environment where a temperature was 20° C. and a humidity was 95% and cured for 7 days, so as to obtain the fly ash-based foamed geopolymer.

The schematic diagram of raw materials used for the fly ash-based foamed geopolymer in this example is shown in FIG. 1.

Example 5

This example provides a fly ash-based foamed geopolymer, and raw materials for preparing the fly ash-based foamed geopolymer comprise the following components in parts by weight:
980 parts of a fly ash-based material;
680 parts of a composite alkali solution;
8 parts of a thickener;
5 parts of a foam stabilizer A;
9 parts of a water reducer; and
35 parts of a foaming agent.

In the raw materials, the thickener is carboxymethyl cellulose ether with a purity of not less than 96% and a viscosity of not less than 30000 cp; the foam stabilizer A is trisodium phosphate with a purity of not less than 98%; the water reducer is a polycarboxylic acid water reducer; the foaming agent is a hydrogen peroxide solution with a concentration of 30%.

The fly ash-based material is prepared by the following preparation method:

fly ash and a calcareous material were added in a mixing kettle and stirred and mixed thoroughly, so as to obtain the fly ash-based material.

Based on a mass of the fly ash-based material being 100%, the fly ash had a content of 98%, and the calcareous material had a content of 2%; the calcareous material was ore slags.

The composite alkali solution has the same preparation method and raw materials as in Example 1.

The composite alkali activator has the same preparation method and raw materials as in Example 1.

A preparation method of the fly ash-based foamed geopolymer comprises the following steps:

(1) the fly ash-based material, the composite alkali solution, the thickener, the foam stabilizer A and the water reducer were put in a mixing kettle according to the formula amounts, and rapidly stirred for 6 min where the stirring blade had a revolution speed of 125 r/min and a rotation speed of 280 r/min, such that the neat slurry was uniform and no solid powders were settled down, so as to obtain a slurry;

(2) the foaming agent was quickly added into the slurry obtained in step (1), and slowly stirred for 40 s where the stirring blade had a revolution speed of 60 r/min and a rotation speed of 135 r/min, so as to obtain a mixture, and subsequently the mixture was quickly injected into a mold to the ½ depth, and then the mold was covered with a polyethylene film to avoid water loss; and (3) the mixture obtained in step (2) and the mold were placed in a curing cabin at 75° C. and cured for 24 h and then demoulded, and subsequently, the demoulded sample was placed in a standard curing environment where a temperature was 20° C. and a humidity was 95% and cured for 7 days, so as to obtain the fly ash-based foamed geopolymer.

The schematic diagram of raw materials used for the fly ash-based foamed geopolymer in this example is shown in FIG. 1.

Example 6

This example differs from Example 1 only in that for the preparation of composite alkali solution, no metal complexing agent was added, the composite alkali activator had a content of 96.3% and the foam stabilizer B had a content of 3.7%, and other conditions are the same as in Example 1.

Example 7

This example differs from Example 1 only in that for the preparation of composite alkali solution, the metal complexing agent had a content of 0.7%, the composite alkali activator had a content of 95.6% and the foam stabilizer B had a content of 3.7%, and other conditions are the same as in Example 1.

Comparative Example 1

This comparative example differs from Example 1 only in that for the raw materials for preparing the fly ash-based foamed geopolymer, the composite alkali solution had an addition amount of 500 parts, and other conditions are the same as in Example 1.

Comparative Example 2

This comparative example differs from Example 1 only in that for the raw materials for preparing the fly ash-based foamed geopolymer, the composite alkali solution had an addition amount of 800 parts, and other conditions are the same as in Example 1.

Comparative Example 3

This comparative example differs from Example 1 only in that for the raw materials for preparing the fly ash-based foamed geopolymer, the foaming agent had an addition amount of 45 parts, and other conditions are the same as in Example 1.

The fly ash-based foamed geopolymers prepared in Examples 1-7 and Comparative Examples 1-3 are subjected to performance tests, and the test methods are as follows.

(1) The compressive strength and apparent density are tested according to the methods specified in GBT 11969-2008 "Test methods of autoclaved aerated concrete"; the 7-day compressive strength refers to the compressive strength of a fly ash-based foamed geopolymer which is obtained by conducting the compressive strength test after curing a demoulded sample in a standard curing environment for 7 days.

(2) Porosity, porosity roundness and equivalent spherical diameter are tested by micron X-ray tomography.

The results of performance tests are shown in Table 1.

TABLE 1

|   | Apparent density (kg/m³) | 7-Day compressive strength (MPa) | Porosity (%) | Porosity roundness | Average equivalent spherical diameter ESD (mm) | Utilization efficiency of fly ash (%) |
| --- | --- | --- | --- | --- | --- | --- |
| Example 1 | 447.1 | 1.79 | 71 | 0.89 | 0.36 | 100 |
| Example 2 | 507.2 | 3.30 | 67 | 0.82 | 0.38 | 90 |
| Example 3 | 521.4 | 3.60 | 65 | 0.88 | 0.38 | 92 |
| Example 4 | 516.2 | 3.10 | 65 | 0.83 | 0.35 | 95 |
| Example 5 | 421.7 | 1.56 | 76 | 0.85 | 0.37 | 98 |
| Example 6 | 494.6 | 0.91 | 63 | 0.87 | 1.71 | 100 |
| Example 7 | 476.9 | 1.21 | 66 | 0.82 | 0.89 | 100 |
| Comparative Example 1 | 465.2 | 1.44 | 74 | 0.79 | 0.54 | 100 |
| Comparative | 455.1 | 1.83 | 73 | 0.90 | 0.39 | 100 |

TABLE 1-continued

| | Apparent density (kg/m³) | 7-Day compressive strength (MPa) | Porosity (%) | Porosity roundness | Average equivalent spherical diameter ESD (mm) | Utilization efficiency of fly ash (%) |
|---|---|---|---|---|---|---|
| Example 2 Comparative Example 3 | 398.1 | 1.15 | 78 | 0.82 | 0.39 | 100 |

As can be seen from Table 1, the fly ash-based foamed geopolymer samples prepared from a large amount of fly ash (utilization efficiency of fly ash: 90%-100%) in Examples 1-5 have the characteristics of low apparent density (421.7-521.4 kg/m³) and high early strength (1.56-3.60 MPa), and can be used as lightweight porous building materials. In addition, by adding the calcareous material, the apparent density of the sample can be effectively increased in a small range, and at the same time the early compressive strength of the sample can be greatly enhanced; it is realized to adjust and control the strength and apparent density of the sample in the actual use process, which satisfies various use scenarios.

Compared with Example 1, the fly ash-based foamed geopolymer samples prepared in Example 6 and Example 7 both have slightly increased apparent density and significantly reduced compressive strength, which indicates that overly much or little addition amount of metal complexing agent will affect the performance of the samples.

Compared with Example 1, the fly ash-based foamed geopolymer sample prepared in Comparative Example 1 has significantly reduced compressive strength, and although the fly ash-based foamed geopolymer sample prepared in Comparative Example 2 has slightly increased compressive strength, its surface has alkali solids and looks white, which affects the surface quality of the product.

Compared with Example 1, the fly ash-based foamed geopolymer sample prepared in Comparative Example 3 has significantly reduced compressive strength.

The applicant has stated that although the fly ash-based foamed geopolymer, the preparation method therefor and the use thereof are described through the above examples, the present application is not limited to the above examples, which means that the implementation of the present application does not necessarily depend on the above examples. It should be apparent to those skilled in the art that any improvements made to the present application, equivalent substitutions of raw materials selected in the present application, addition of adjuvant ingredients, selection of specific manners, etc. shall all fall within the protection scope and the disclosure scope of the present application.

What is claimed is:

1. A fly ash-based foamed geopolymer, wherein raw materials for preparing the fly ash-based foamed geopolymer comprise the following components in parts by weight:
   900-1000 parts of a fly ash-based material;
   600-700 parts of a composite alkali solution;
   0-10 parts of a thickener;
   2-6 parts of a foam stabilizer A;
   5-10 parts of a water reducer; and
   20-40 parts of a foaming agent;
   wherein when a calcareous material is present, the fly ash-based material is prepared by the following preparation method:
   mixing fly ash with the calcareous material to obtain the fly ash-based material;
   wherein based on a mass of the fly ash-based material being 100%, the fly ash has a content of 90%-100%, and the calcareous material has a content of 0%-10%;
   wherein the calcareous material comprises any one or a combination of at least two of cement, ore slags, gypsum or metakaolin;
   wherein the composite alkali solution is prepared by the following preparation method:
   mixing a composite alkali activator, a metal complexing agent and a foam stabilizer B to obtain the composite alkali solution;
   based on a mass of the composite alkali solution being 100%, the composite alkali activator has a content of 95%-98%, the metal complexing agent has a content of 0.05%-0.5%, and the foam stabilizer B has a content of 1.95%-4.5%;
   wherein the foam stabilizer A comprises trisodium phosphate and/or calcium stearate powders;
   the foam stabilizer B comprises any one or a combination of at least two of sodium dodecylbenzenesulfonate powders, sodium dodecyl sulfate powders, trisodium phosphate powders or calcium dodecyl sulfate powders.

2. The fly ash-based foamed geopolymer according to claim 1, wherein the composite alkali activator has a modulus of 1.0-1.5.

3. The fly ash-based foamed geopolymer according to claim 1, wherein the metal complexing agent comprises any one or a combination of at least two of triethanolamine, methyldiethanolamine, diisopropanolamine, diethanolisopropanolamine, triethanolamine or triisopropanolamine.

4. The fly ash-based foamed geopolymer according to claim 3, wherein the metal complexing agent has a solid content of not less than 78%.

5. The fly ash-based foamed geopolymer according to claim 1, wherein the foam stabilizer B has a purity of not less than 88%.

6. The fly ash-based foamed geopolymer according to claim 1, wherein the composite alkali activator is prepared by the following preparation method:
   adding sodium hydroxide powders and water into water glass, and stirring to obtain the composite alkali activator.

7. The fly ash-based foamed geopolymer according to claim 6, wherein based on a mass of the composite alkali activator being 100%, the sodium hydroxide powders have a content of 8.5%-9%, the water has a content of 4.5%-7%, and the water glass has a content of 84%-87%.

8. The fly ash-based foamed geopolymer according to claim 6, wherein the sodium hydroxide powders have a purity of not less than 96%.

9. The fly ash-based foamed geopolymer according to claim 6, wherein the water is tap water.

10. The fly ash-based foamed geopolymer according to claim 6, wherein the water glass has a modulus of 1.0-3.8 and a Baume degree of 34.0-42.0.

11. The fly ash-based foamed geopolymer according to claim 1, wherein the thickener comprises methyl cellulose ether and/or carboxymethyl cellulose ether.

12. The fly ash-based foamed geopolymer according to claim 11, wherein the thickener comprises methyl cellulose ether and carboxymethyl cellulose ether.

13. The fly ash-based foamed geopolymer according to claim 11, wherein the thickener has a purity of not less than 96%.

14. The fly ash-based foamed geopolymer according to claim 11, wherein the thickener has a viscosity of not less than 30000 cp.

15. The fly ash-based foamed geopolymer according to claim 1, wherein the trisodium phosphate has a purity of not less than 98%.

16. The fly ash-based foamed geopolymer according to claim 1, the calcium stearate powders have a purity of not less than 99%.

17. The fly ash-based foamed geopolymer according to claim 1, wherein the water reducer comprises any one or a combination of at least two of a polycarboxylic acid water reducer, a naphthalene sulfonate water reducer, an aliphatic water reducer, a lignosulfonate water reducer or an aminosulfonate water reducer.

18. The fly ash-based foamed geopolymer according to claim 1, wherein the foaming agent comprises a hydrogen peroxide solution.

19. The fly ash-based foamed geopolymer according to claim 18, wherein the hydrogen peroxide solution has a concentration of not less than 30%.

20. A preparation method for the fly ash-based foamed geopolymer according to claim 1, comprising the following steps:
   (1) stirring the fly ash-based material, the composite alkali solution, the thickener, the foam stabilizer A and the water reducer according to formula amounts to obtain a slurry;
   (2) adding the foaming agent into the slurry obtained in step (1), stirring to obtain a mixture, and then injecting the mixture into a mold; and
   (3) placing the mixture and the mold in step (2) in a curing chamber for curing, demoulding, and then placing the demoulded sample in a curing environment for curing, so as to obtain the fly ash-based foamed geopolymer.

21. The preparation method according to claim 20, wherein the stirring in step (1) is carried out in a mixing kettle.

22. The preparation method according to claim 20, wherein a stirring blade for the stirring in step (1) has a revolution speed of 115-135 r/min and a rotation speed of 275-295 r/min.

23. The preparation method according to claim 20, wherein the stirring in step (1) is performed for a period of 4-6 min.

24. The preparation method according to claim 20, wherein a stirring blade for the stirring in step (2) has a revolution speed of 57-67 r/min and a rotation speed of 135-145 r/min.

25. The preparation method according to claim 20, wherein the stirring in step (2) is performed for a period of 20-40 s.

26. The preparation method according to claim 20, wherein the process of injecting the mixture into the mold in step (2) is to inject the mixture into a depth of ½ of the mold.

27. The preparation method according to claim 20, wherein the curing chamber in step (3) has a temperature of 65-75° C.

28. The preparation method according to claim 20, wherein the process of curing in the curing chamber in step (3) is performed for a period of 12-24 h.

29. The preparation method according to claim 20, wherein the curing environment in step (3) has a temperature of 18-22° C. and a humidity of at least 95%.

30. The preparation method according to claim 20, wherein a process of curing in the curing environment in step (3) is performed for a period of 7 days.

* * * * *